DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 7, 1972

904 O.G. 6

T904,003
COMPETING COUPLERS
Ilmari F. Salminen, Rochester, N.Y. 14626
Filed Nov. 19, 1971, Ser. No. 190,463
Int. Cl. G03c *7/00, 1/40*
U.S. Cl. 96—56.4
No Drawing. 29 Pages Specification

A class of coumaran-2-one compounds of the formula

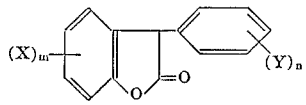

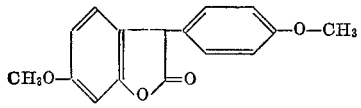

wherein X and Y are individually defined as an alkyl group or an alkoxy group; *n* is an integer of 1–5; and *m* is an integer of 0–3; wherein at least one of the Y substituents is substituted in para position on the phenyl ring and wherein X can be defined as both an alkyl group and an alkoxy group on the same ring when *m* is greater than 1, and Y can be defined as both an alkyl group and an alkoxy group on the same ring when *n* is greater than 1. The above-defined compounds have utility as diffusible or non-diffusible competing couplers in the color photographic art as components of a color developer solution, a photographic silver halide emulsion, or corresponding color photographic element. A competing coupler within this class is the compound